Dec. 18, 1928.                                1,695,512
                    J. STURROCK
              FRAME ADJUSTING MEANS
                Filed Aug. 9, 1924
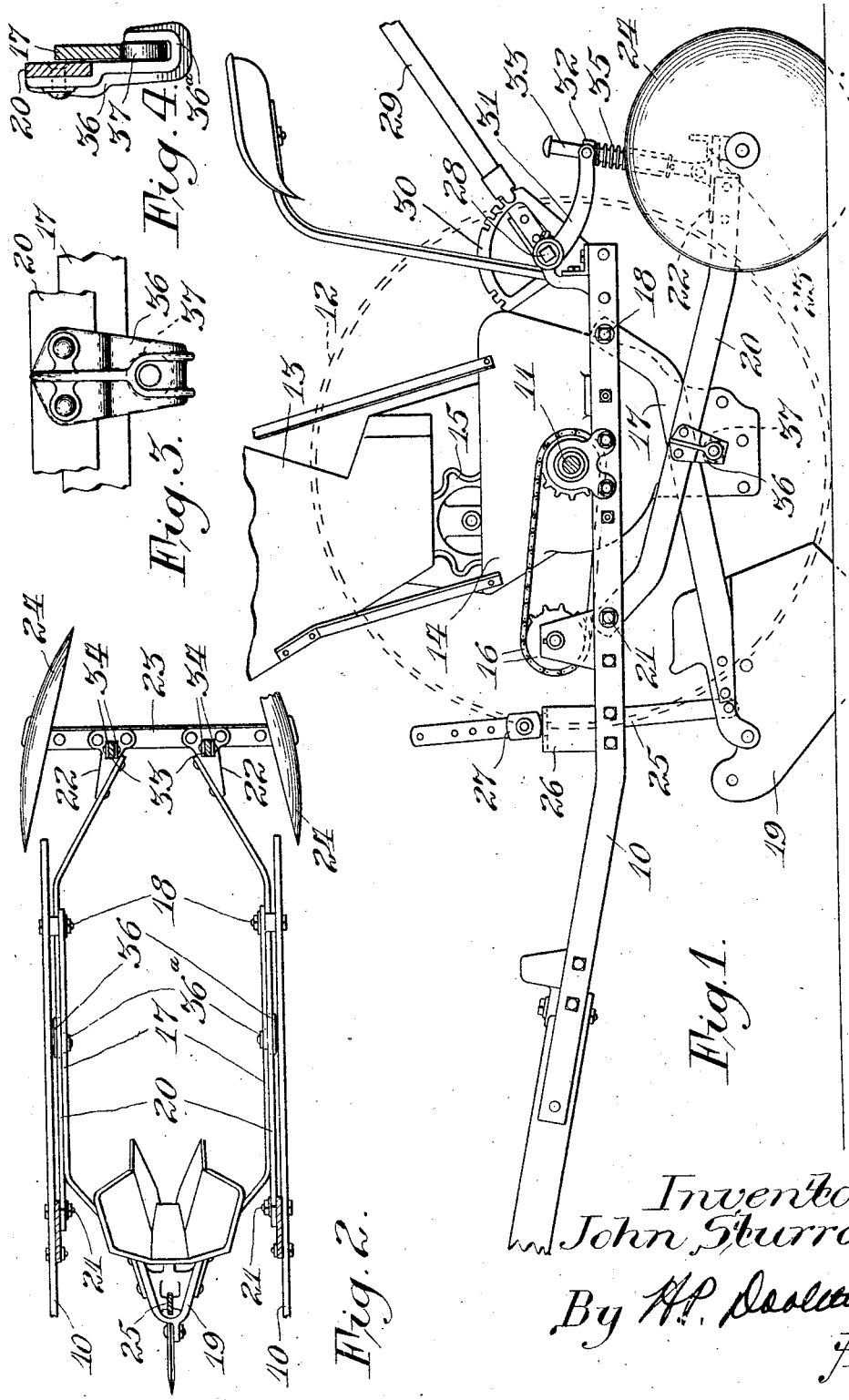
Inventor.
John Sturrock,
By H.P. Doolittle
                    Atty.

Patented Dec. 18, 1928.

1,695,512

UNITED STATES PATENT OFFICE.

JOHN STURROCK, OF CHICAGO, ILLINOIS, ASSIGNOR TO INTERNATIONAL HARVESTER COMPANY, OF CHICAGO, ILLINOIS, A CORPORATION OF NEW JERSEY.

FRAME-ADJUSTING MEANS.

Application filed August 9, 1924. Serial No. 731,059.

This invention relates to construction of implement frames and, more particularly, to the tool carrying frames of a planter, such as a potato planter.

In potato planters or similar machines it is necessary to have a furrow forming tool at the forward portion of the machine and covering tools at the rear and that each be capable of vertical movement and adjustment, and the object of this invention is to simplify the construction and arrangement of the frames carrying the furrow opening and covering tools and to provide a novel and simple construction for effecting lifting and lowering of the frames carrying said tools by means of a single control device.

With this principal and other minor objects in view, the invention resides in the organization and details of construction hereinafter described in detail and claimed.

Referring to the accompanying drawing,—

Fig. 1 is a side view of a potato planter frame embodying the invention;

Fig. 2 is a detail plan view of the frames carrying the furrow opening and covering tools;

Fig. 3 is an enlarged detail side view of one of the pick-up brackets employed in the construction; and Fig. 4 is a similar detail view from a direction at right angles to that in Fig. 3.

In the present instance the invention is illustrated as applied to a potato planter comprising a supporting frame 10 carried on an axle 11 on which are the transporting wheels 12. The planter comprises a hopper 13 mounted on a magazine 14 in which the potatoes are fed by suitable mechanism including the feed wheel 15, which is driven from the axle by suitable gearing shown in part at 16.

The structure comprising the invention includes frame members 17 which are pivoted at one end to the rear portion of the main frame 10, as at 18, from which point they extend forwardly in parallel relation to a point at their forward ends where they converge and are secured to the opposite sides of the furrow opening shoe or runner 19. A similar frame consisting of members 20 pivoted to the forward portion of the supporting frame 10 at 21 has its members extending rearwardly in parallel relation until the rear ends of said members converge and are secured to brackets 22 carrying a transverse bar 23, on the ends of which are journaled coverer disks 24. The two implement frames are accordingly horizontally pivoted to the supporting frame at the front and rear thereof, respectively, and extend oppositely in intersecting relation to each other, the shape of the frames providing for a central open space which will be occupied by the usual mechanism for conducting seed and fertilizer to the furrow formed by the furrow opening tool 19. The forward or free end of the frame formed by the member 17 carries an upright, pivoted bar 25 which extends through an opening in a cross member 26 on the supporting frame where bar 25 carries an adjustable supporting sleeve 27, which rests on cross-piece 26 and serves to determine the depth to which the furrow opener 19 may go. The implement frame comprising the members 20 is controlled by lifting and lowering mechanism mounted on the rear end of the main frame 10 comprising a rock shaft 28, to which is fixed a lever 29 cooperating in the usual manner with a locking rack 30. The rock shaft 28 has fixed thereto lifting arms 31, each of which carries a pivoted collar 32 through which lifting links 33 are slidable. Each link 33 is pivoted between ears 34 on the brackets 22 (Fig. 2) and carries a compression spring 35 for imparting a yielding thrust to the coverer disks. It will be obvious that swinging of the lever 29 will serve to raise and lower the frame carrying the coverer disks when swung to its extremes of movement and can be used to adjust the depth of the coverer disks if moved from notch to notch in the rear end of rack 30. In order to provide for joint lifting and lowering movement of the two implement carrying frames, while dispensing with the usual independent mechanisms for each frame, or auxiliary lifting links heretofore employed, each bar 20 of the coverer carrying frame is provided with a pick-up bracket 36, which is secured to the outer face of the bar 20 at the point of intersection with bar 17 of the opener frame and provided with an inwardly and upwardly bent or hook-shaped lower end 36$^a$ carrying a roller 37 (Fig. 4). This roller in each bracket is positioned so as to engage under one of the bars 17 of the frame carrying the furrow opener when the coverer carrying frame is being raised, and it follows that lifting of the coverer frame by means of the lever 29 will pick up the furrow opener frame and impart joint vertical movement thereto, causing both frames to be lifted clear of the soil. On reverse movement of lever 29, both frames will be lowered jointly until limit of movement of the opener frame is reached, as determined by the position of sleeve 27, when the coverers can be lowered to a greater degree if desired, the opener frame being left free to float independently of the coverer frame.

It will be clear from the foregoing description that a novel and simplified construction and arrangement for implement carrying frames of the type specified has been devised and that considerable modification of the particular structure disclosed may be made without departing from the gist of the invention as defined in the following claims.

What is claimed as new is:

1. An implement of the class described comprising, in combination, a wheel supported main frame, an earth working element positioned near the rearward end of the main frame, a dragbar pivoted to the main frame and extending rearwardly to the earth working element, a furrow former positioned underneath the forward part of the main frame, a push bar pivoted near the rearward end of the main frame and extending forwardly to the furrow former, elevating and depressing means mounted on the rearward end of the main frame and connected to the earth working element so as to raise or lower it, and anti-friction means secured to one of said bars and extending into the path of movement of the other bar so as to cause the earth working element and the furrow former to partake of joint and simultaneous upward movement.

2. An implement of the class described comprising, in combination, a wheel supported main frame, substantially parallel fore and aft bars constituting parts of the main frame, an earth working element positioned near the rearward end of the main frame, a dragbar pivotally connected to each of the main frame bars, each of said dragbars extending rearwardly to positions from which they converge toward the earth working element, a furrow former positioned underneath the forward end of the main frame, push bars pivoted to the respective main frame bars near the rearward end of the main frame and extending forwardly transversely of and within the dragbars to positions at which they are secured to the furrow former, inwardly projecting brackets secured to the bars of one of said sets of pivoted bars for causing the bars of the other set to move jointly and simultaneously therewith, said means being located substantially at the positions of intersection of the pivoted bars, and a link pivotally connected to the furrow former and extending upwardly so as to limit the downward movement of the furrow former by the engagement of a part against the main frame.

In testimony whereof I affix my signature.

JOHN STURROCK.